US012769264B2

(12) United States Patent
Ikeuchi et al.

(10) Patent No.: US 12,769,264 B2
(45) Date of Patent: Oct. 20, 2026

(54) SUPPORT DEVICE, SUPPORT METHOD, SUBSTRATE PROCESSING SYSTEM, AND STORAGE MEDIUM

(71) Applicant: SCREEN Holdings Co., Ltd., Kyoto (JP)

(72) Inventors: Takashi Ikeuchi, Kyoto (JP); Takehiro Sano, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 497 days.

(21) Appl. No.: 18/366,418

(22) Filed: Aug. 7, 2023

(65) Prior Publication Data

US 2024/0103462 A1 Mar. 28, 2024

(30) Foreign Application Priority Data

Sep. 26, 2022 (JP) ................................ 2022-152398

(51) Int. Cl.
*G05B 13/04* (2006.01)
*G05B 13/02* (2006.01)

(52) U.S. Cl.
CPC ....... *G05B 13/042* (2013.01); *G05B 13/0265* (2013.01)

(58) Field of Classification Search
CPC .......................... G05B 13/0265; G05B 13/042
See application file for complete search history.

(56) References Cited

U.S. PATENT DOCUMENTS 11,164,768 B2 11/2021 Vukkadala et al.
2022/0093409 A1 3/2022 Namiki et al.
2022/0309198 A1 9/2022 Hitosugi et al.
2023/0130343 A1 4/2023 Nakao et al.
2023/0135102 A1* 5/2023 Pack ........................ G06N 7/01 700/97
2023/0154774 A1 5/2023 Sakamoto et al.
2023/0170069 A1* 6/2023 Groteke ................ G06V 40/25 382/128

FOREIGN PATENT DOCUMENTS

CN 113329845 A 8/2021
CN 114840403 A 8/2022

(Continued)

*Primary Examiner* — Tameem D Siddiquee

(74) *Attorney, Agent, or Firm* — OSTROLENK FABER LLP

(57) ABSTRACT

A support device supports adjustment of values of parameters of a substrate processing apparatus. The parameters include detection target parameters of which corresponding physical quantities are to be detected. An arithmetic processing section of the support device builds a predictive model through a first machine leaning model performing learning of quality data and detection data pieces relating to the physical quantities. The arithmetic processing section acquires detection data recommended values by executing Bayesian optimization based on the predictive model, an acquisition function, and a search range. The arithmetic processing section causes a second machine learning model to perform learning of the detection data pieces and values of the parameters. The arithmetic processing section outputs parameter recommended values by inputting the detection data recommended values to the second machine learning model having performed the learning.

14 Claims, 11 Drawing Sheets

(56) References Cited

FOREIGN PATENT DOCUMENTS

| | | | |
|---|---|---|---|
| JP | 2021-100039 | A | 7/2021 |
| JP | 2021-101465 | A | 7/2021 |
| JP | 2021166229 | A | 10/2021 |
| JP | 2022-014878 | A | 1/2022 |
| JP | 7472969 | B2 | 4/2024 |
| TW | 202042963 | A | 12/2020 |

* cited by examiner

| Experiment | Parameter setting value | Sensing data (Raw data) | Quality data |
|---|---|---|---|
| 1 | X{P1,P2,P3,P4, P5,P6,···} | Z1{SE1,SE2,SE3···} | Y |
| 2 | X{P1,P2,P3,P4, P5,P6,···} | Z1{SE1,SE2,SE3···} | Y |
| 3 | X{P1,P2,P3,P4, P5,P6,···} | Z1{SE1,SE2,SE3···} | Y |
| 4 | X{P1,P2,P3,P4, P5,P6,···} | Z1{SE1,SE2,SE3···} | Y |
| 5 | X{P1,P2,P3,P4, P5,P6,···} | Z1{SE1,SE2,SE3···} | Y |
| 6 | X{P1,P2,P3,P4, P5,P6,···} | Z1{SE1,SE2,SE3···} | Y |
| | | | |

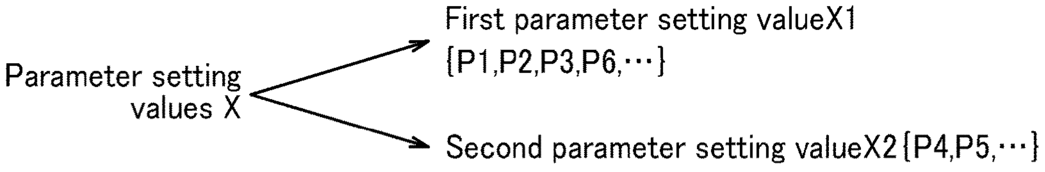

FIG. 9A

First dataset DS1

| Experiment | Target variable | Explanatory variable | |
|---|---|---|---|
| | Quality data | Preprocessed sensing data | Second parameter setting value |
| 1 | Y | Z2{ASE1,ASE2,ASE3···} | X2{P4,P5,···} |
| 2 | Y | Z2{ASE1,ASE2,ASE3···} | X2{P4,P5,···} |
| 3 | Y | Z2{ASE1,ASE2,ASE3···} | X2{P4,P5,···} |
| 4 | Y | Z2{ASE1,ASE2,ASE3···} | X2{P4,P5,···} |
| 5 | Y | Z2{ASE1,ASE2,ASE3···} | X2{P4,P5,···} |
| 6 | Y | Z2{ASE1,ASE2,ASE3···} | X2{P4,P5,···} |

FIG. 9B

Second dataset DS2

| Experiment | Target variable | Explanatory variable | |
|---|---|---|---|
| | First parameter setting value | Preprocessed sensing data | Second parameter setting value |
| 1 | X1{P1,P2,P3,P6,···} | Z2{ASE1,ASE2,ASE3···} | X2{P4,P5,···} |
| 2 | X1{P1,P2,P3,P6,···} | Z2{ASE1,ASE2,ASE3···} | X2{P4,P5,···} |
| 3 | X1{P1,P2,P3,P6,···} | Z2{ASE1,ASE2,ASE3···} | X2{P4,P5,···} |
| 4 | X1{P1,P2,P3,P6,···} | Z2{ASE1,ASE2,ASE3···} | X2{P4,P5,···} |
| 5 | X1{P1,P2,P3,P6,···} | Z2{ASE1,ASE2,ASE3···} | X2{P4,P5,···} |
| 6 | X1{P1,P2,P3,P6,···} | Z2{ASE1,ASE2,ASE3···} | X2{P4,P5,···} |

FIG. 9C

SUPPORT DEVICE, SUPPORT METHOD, SUBSTRATE PROCESSING SYSTEM, AND STORAGE MEDIUM

INCORPORATION BY REFERENCE

The present application claims priority under 35 U.S.C. § 119 to Japanese Patent Application No. 2022-152398, filed on Sep. 26, 2022. The contents of this application are incorporated herein by reference in their entirety.

BACKGROUND

The subject matter of the present application relates to a support device, a support method, a substrate processing system, and a storage medium.

Substrate processing apparatuses that perform substrate processing are known. The substrate processing apparatuses operate based on parameters (condition) set in for example a recipe. In a substrate processing apparatus such as above, it is necessary to adjust setting values of the parameters so that a result of the substrate processing reaches a target value or a tolerable value. Typically, the setting values of the parameters are adjusted in a manner that substrate processing (experiment) is repeated while the setting values of the parameters are changed and the result (experimental result) is confirmed each time the substrate processing is performed. As described above, the task of adjusting the setting values of the parameters is a very time-consuming task.

Japanese Patent Application Laid-Open Publication No. 2021-166229 discloses a method for automating processing condition derivation processing. Specifically, in a first step, a wafer is processed under a provisional processing condition and the provisional processing condition and the actual processing result are stored in a database in association with each other. In a second step, learning (machine learning) is performed using the information accumulated in the database to generate a regression model that derives an estimated processing result from a processing condition. In a third step, an optimum processing condition that outputs a target processing result is searched for according to Bayesian optimization through repetitive input (through simulation) of the regression model while changing the parameters. In a fourth step, the estimated processing result is compared with each actual processing result and data where modification of the processing condition is necessary is accumulated in the database to regenerate a regression model (active learning).

SUMMARY

However, there will be a slight discrepancy between the actual operation and the setting values of the parameters in the substrate processing apparatus. As such, only learning of the relationship between the setting values of the parameters and the result of the substrate processing limits improvement in quality of the substrate processing. Therefore, there is room for further improvements in the method for supporting adjustment of the parameter setting values in order to further improve quality of the substrate processing.

According to an aspect of the present disclosure, a support device supports adjustment of values of parameters of a substrate processing apparatus that operates based on the parameters to perform substrate processing. The parameters include detection target parameters of which corresponding physical quantities are to be detected. The support device includes an arithmetic processing section that outputs parameter recommended values using a first machine learning model and a second learning model, the parameter recommended values being recommended values of the values of the parameters. The arithmetic processing section builds a predictive model that predicts quality of the substrate processing performed by the substrate processing apparatus through the first machine learning model performing learning of first training data. The first training data includes detection data pieces relating to the physical quantities and quality data relating to the quality of the substrate processing by the substrate processing apparatus. The arithmetic processing section acquires detection data recommended values by executing Bayesian optimization based on the predictive model, an acquisition function, and a search range. The detection data recommended values are recommended values of the detection data pieces that bring the quality of the substrate processing close to target quality. The arithmetic processing section causes the second machine learning model to perform learning of the second training data. The second training data includes the detection data pieces and values of the detection target parameters that are set at detection of the physical quantities. The arithmetic processing section converts the detection data recommended values to the parameter recommended values by inputting the detection data recommended values to the second machine learning model having performed the learning.

In an embodiment, the detection data pieces includes preprocessed data pieces that are acquired by performing preprocessing of raw data pieces each indicating a corresponding one of the physical quantities. The arithmetic processing section generates the preprocessed data pieces by performing the preprocessing on each of the raw data pieces. A number of data pieces of each of the preprocessed data pieces is smaller than that of each of the raw data pieces.

In one embodiment, the preprocessing includes processing of extracting a feature amount of each of the raw data pieces.

In one embodiment, the processing of extracting a feature amount of each of the raw data pieces includes processing of reducing a dimension of each of the raw data pieces.

In one embodiment, the processing of extracting a feature amount of each of the raw data pieces includes processing of calculating a summary statistic of each of the raw data pieces.

In one embodiment, the preprocessing includes processing of extracting any one or more data pieces from each of the raw data pieces.

According to another aspect of the present disclosure, a support method is provided for supporting adjustment of values of parameters of a substrate processing apparatus that operates based on the parameters to perform substrate processing. The parameters include detection target parameters of which corresponding physical quantities are to be detected. The support method includes: building a predictive model that predicts quality of the substrate processing performed by the substrate processing apparatus through a first machine learning model performing learning of first training data that includes detection data pieces relating to the physical quantities and quality data relating to the quality of the substrate processing by the substrate processing apparatus; acquiring recommended values of the detection data pieces by executing Bayesian optimization based on the predictive model, an acquisition function, and a search range, the recommended values of the detection data pieces being values that bring the quality of the substrate processing close to target quality; causing a second machine learning model to perform learning of second training data including the detection data pieces and values of the detection target parameters that are set at detection of the physical quantities; and converting the recommended values of the detection data pieces to recommended values of the parameters by inputting the recommended values of the detection data pieces to the second machine learning model having performed the learning.

In one embodiment, the detection data pieces include preprocessed data pieces that are acquired by performing preprocessing of raw data pieces each indicating a corresponding one of the physical quantities. The support method further includes generating the preprocessed data pieces by performing the preprocessing on each of the raw data pieces. A number of data pieces of each of the preprocessed data pieces is smaller than that of each of the raw data pieces.

In one embodiment, the preprocessing includes processing of extracting a feature amount of each of the raw data pieces.

In one embodiment, the processing of extracting a feature amount of each of the raw data pieces includes processing of reducing a dimension of each of the raw data pieces.

In one embodiment, the processing of extracting a feature amount of each of the raw data pieces includes processing of calculating summary statistics of the raw data pieces.

In one embodiment, the processing includes processing of extracting any one or more data pieces from each of the raw data pieces.

According to still another aspect of the present disclosure, a substrate processing system includes the aforementioned support device and the substrate processing apparatus that operates based on the parameters to perform the substrate processing.

According to yet another aspect of the present disclosure, a storage medium is a non-transitory computer-readable storage medium that stores therein a support program that a computer is to execute. The support program causes the computer to execute arithmetic operation according to the aforementioned support method.

BRIEF DESCRIPTION OF THE DRAWINGS

FIG. 9A illustrates processing of dividing parameter setting values. FIG. 9B indicates first datasets. FIG. 9C indicates second datasets.

DESCRIPTION OF EMBODIMENTS

Figure 1:
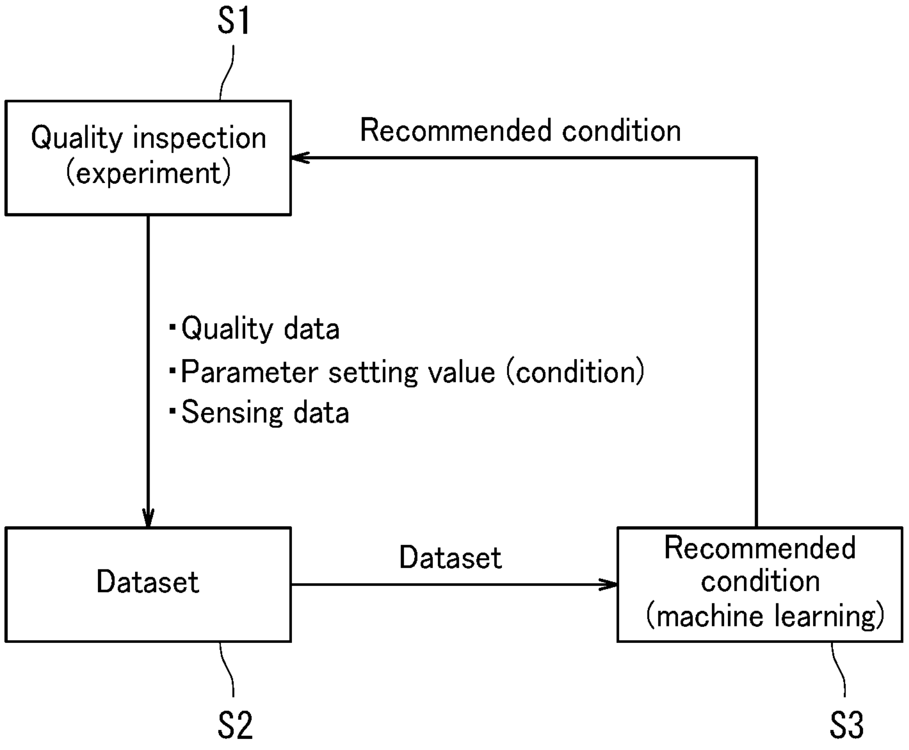
FIG. 1 illustrates the overview of a support method according to an embodiment.

The following describes embodiments of a support device, a support method, a substrate processing system, and a storage medium according to the subject matter of the present application with reference to the accompanying drawings (FIGS. 1 to 13). However, the subject matter of the present application is not limited to the following embodiments and can be practiced within a scope not departing from the gist of the present disclosure with alterations made as appropriate. Some overlapping explanations may be omitted as appropriate. Furthermore, elements that are the same or equivalent are indicated by the same reference signs in the drawings and description thereof is not repeated.

Various substrates such as a semiconductor water, a glass substrate for photomask use, a glass substrate for liquid crystal display use, a glass substrate for plasma display use, a substrate for field emission display (FED) use, a substrate for optical disc use, a substrate for magnetic disc use, and a substrate for magneto-optical disc use are applicable to a "substrate" in the embodiments. Although the following mainly describes an embodiment using examples of a support device, a support method, a substrate processing system, and a storage medium that are used in processing of a disc-shaped semiconductor wafer, the present disclosure is also applicable to various substrates as listed above. Furthermore, various shapes are also employable to the substrate.

First of all, an overview of the support method of the present embodiment will be described with reference to FIG. 1. The support method of the present embodiment supports adjustment of parameter setting values X done by an operator. Specifically, the support method of the present embodiment provides recommended values RX (recommended condition) of parameters. Here, the parameter setting values X each are a setting value of a corresponding one of the parameters of a substrate processing apparatus 100 (see FIG. 3). Note that the parameters include both a parameter defined in a recipe and a parameter not defined in the recipe.

FIG. 1 illustrates the overview of the support method of the present embodiment. As illustrated in FIG. 1, the support method of the present embodiment includes Steps S1 to S3. Specifically, the operator repeats Steps S1 to S3 until quality of substrate processing reaches a target value or a tolerable value.

In Step S1, a quality inspection (experiment) is performed. As a result, quality data Y is acquired. The quality data Y is data relating to quality of the substrate processing by the substrate processing apparatus 100. An index (quality data Y) of quality includes the number of particles attached to a substrate W as a result of the substrate processing, a collapse rate, or an amount of etching. Specifically, the substrate processing apparatus 100 processes an unprocessed substrate W based on provisionally setting values of the parameters. Then, an inspection of the processed substrate W is performed by an inspection tool. As a result, the quality data Y is acquired. Note that in the following, the unprocessed substrate W may be also referred to as "unprocessed substrate Wa". Also, the processed substrate W may be referred to below as "processed substrate Wb".

In Step S2, a dataset DS is generated based on the quality data Y, the parameter setting values X, and sensing data Z1. The sensing data Z1 indicates physical quantities detected by sensors provided in the substrate processing apparatus 100. Detection targets of the sensors each correspond to one of the parameter setting values X. For example, the parameter setting values X include a setting value of a flow rate of a processing liquid. The sensing data Z1 (physical quantities) includes a detection value (detection result SE) of the flow rate of the processing liquid. Note that the substrate processing apparatus 100 in the present embodiment processes the substrate W (unprocessed substrate Wa) with the processing liquid.

In Step S3, a machine learning model M learns the dataset DS and outputs a recommended condition (recommended values RX of the parameters).

Once the recommended values RX of the parameters are output, the setting values X of the parameters are adjusted to the recommended values RX, and the quality inspection (Step S1) is then re-performed. Once the result (quality data Y) of the quality inspection reaches the target value or the tolerable value, the operator selects the recommended values RX at that time as setting values X of the parameters. When the result (quality data Y) of the quality inspection does not reach the target value or the tolerable value, the processes of Steps S2 and the subsequent step are repeated.

Figure 2:
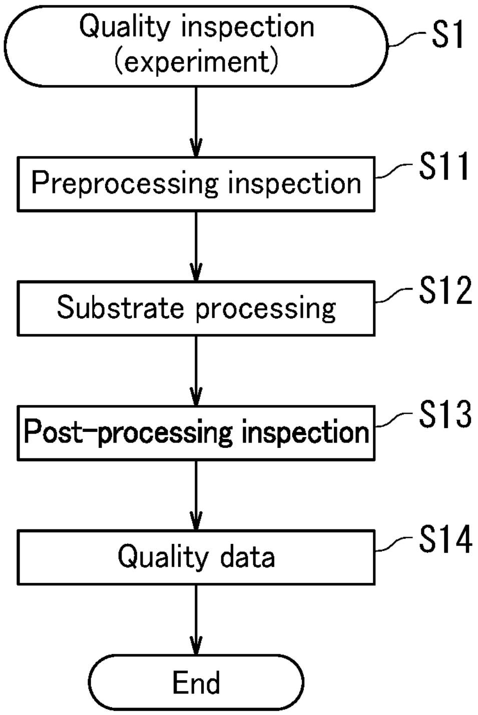
FIG. 2 depicts an example of a quality inspection illustrated in FIG. 1.

Next, an example of the quality inspection (Step S1) will be described with reference to FIG. 2. FIG. 2 depicts an example of the quality inspection (Step S1) illustrated in FIG. 1. The quality inspection depicted in FIG. 2 is applicable to for example an inspection for measuring an amount of etching and an inspection for measuring the number of particles attached to a substrate W as a result of the substrate processing. The quality inspection depicted in FIG. 2 includes Steps S11 to S14.

First, a preprocessing inspection is performed (Step S11). The preprocessing inspection is an inspection of an unprocessed substrate Wa. For example, a distribution of particles attached to the unprocessed substrate Wa is detected in the preprocessing inspection. More specifically, the coordinates of each particle attached to the unprocessed substrate Wa are obtained. The origin of the coordinates is the center of the substrate W. Alternatively, the film thickness of the unprocessed substrate Wa is measured in the preprocessing inspection. Note that in the following description, the particles attached to the unprocessed substrate Wa may be also referred to below as "preprocessing particles".

Figure 3:
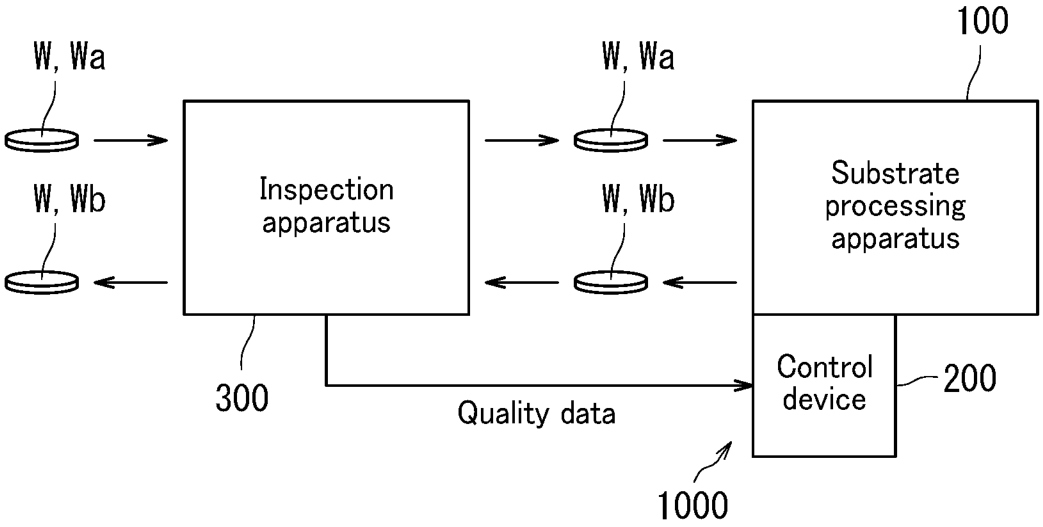
FIG. 3 illustrates a substrate processing system and an inspection apparatus.

After the preprocessing inspection, substrate processing is performed (step S12) by the substrate processing apparatus 100 (see FIG. 3). The substrate processing is cleaning or etching, for example.

After the substrate processing, an inspection is performed on the processed substrate Wb (Step S13). The inspection after the substrate processing is the same as the preprocessing inspection. For example, a distribution of particles attached to the processed substrate Wb is detected in the inspection after the substrate processing. More specifically, the coordinates of each particle attached to the processed substrate Wb are obtained. Alternatively, the film thickness of the processed substrate Wb is measured in the inspection after the substrate processing. Note that in the following description, the particles attached to the processed substrate Wb may be also referred to as "post-processing particles".

After the inspection after the substrate processing, quality data Y is generated (Step S14). For example, the number of particles attached to the substrate W as a result of the substrate processing is calculated based on the distribution of the preprocessing particles and the distribution of the post-processing particles. In detail, the following counting processing is executed. That is, it is determined whether or not the coordinates of any of the preprocessing particles are included within a circle with a radius Th centered on the coordinates of a post-processing particle being an inspection target. When the coordinates of none of the preprocessing particles are included within the circle of the inspection target, the post-processing particle on the inspection target is counted as a particle attached to the substrate W as a result of the substrate processing. The above counting processing is executed on all of the post-processing particles to count the number of particles attached to the substrate W as a result of the substrate processing. In a case of acquiring an amount of etching, a difference between the film thickness of the unprocessed substrate Wa and the film thickness of the processed substrate Wb is calculated. When the quality data Y is generated, the quality inspection (Step S1) ends.

Note that in a case in which a collapse rate is inspected as an index of the quality, the preprocessing inspection is not performed. In the following, the present embodiment is described using an example in a case in which the number of particles generated as a result of the substrate processing is measured.

Next, an example of the quality inspection (Step S1) illustrated in FIG. 1 is described with reference to FIG. 3. FIG. 3 illustrates a substrate processing system 1000 and an inspection apparatus 300.

The substrate processing system 1000 processes a substrate W. As illustrated in FIG. 3, the substrate processing system 1000 includes a substrate processing apparatus 100 and a control device 200. The substrate processing apparatus 100 operates based on parameters to process the substrate W (unprocessed substrate Wa). In detail, the control device 200 controls the operation of the substrate processing apparatus 100 based on the parameters. The inspection apparatus 300 detects a distribution of particles attached to the substrate W. More specifically, the inspection apparatus 300 obtains coordinates of each particle attached to the substrate W.

In order to adjust the parameter setting values X, the inspection apparatus 300 detects a distribution of particles on the unprocessed substrate Wa and the substrate processing apparatus 100 performs the substrate processing on the unprocessed substrate Wa having been inspected by the inspection apparatus 300. Thereafter, the inspection apparatus 300 detects a distribution of particles on the substrate W (processed substrate Wb) having been processed by the substrate processing apparatus 100.

In the present embodiment, the inspection apparatus 300 generates the quality data Y. Specifically, the inspection apparatus 300 obtains the number of particles attached to the substrate W as a result of the substrate processing based on the distribution of the particles (post-processing particles) attached to the processed substrate Wb and the distribution of the particles (preprocessing particles) attached to the unprocessed substrate Wa. In detail, the inspection apparatus 300 calculates the number of the particles attached to the substrate W as a result of the substrate processing through execution of the previously described counting processing on each post-processing particle. Note that the inspection apparatus 300 stores the radius Th therein.

The quality data Y is input to the control device 200. The control device 200 is an example of a "support device". For example, the quality data Y may be transmitted from the inspection apparatus 300 to the control device 200 via a cable or by wireless communication. Alternatively, the quality data Y may be input to the control device 200 from a removable medium. Examples of the removable medium include memory cards such as a SD card, a storage medium such as universal serial bus (USB) memory, and optical discs such as a compact disc (CD) and a digital versatile disc (DVD).

Note that the quality data Y is generated by the inspection apparatus 300 in the present embodiment, but may be generated by the control device 200. In this case, the distribution of the particles (coordinates of each preprocessing particle) on the unprocessed substrate Wa and the distribution of the particles (coordinates of each post-processing particle) on the processed substrate Wb are input to the control device 200.

Figure 4:
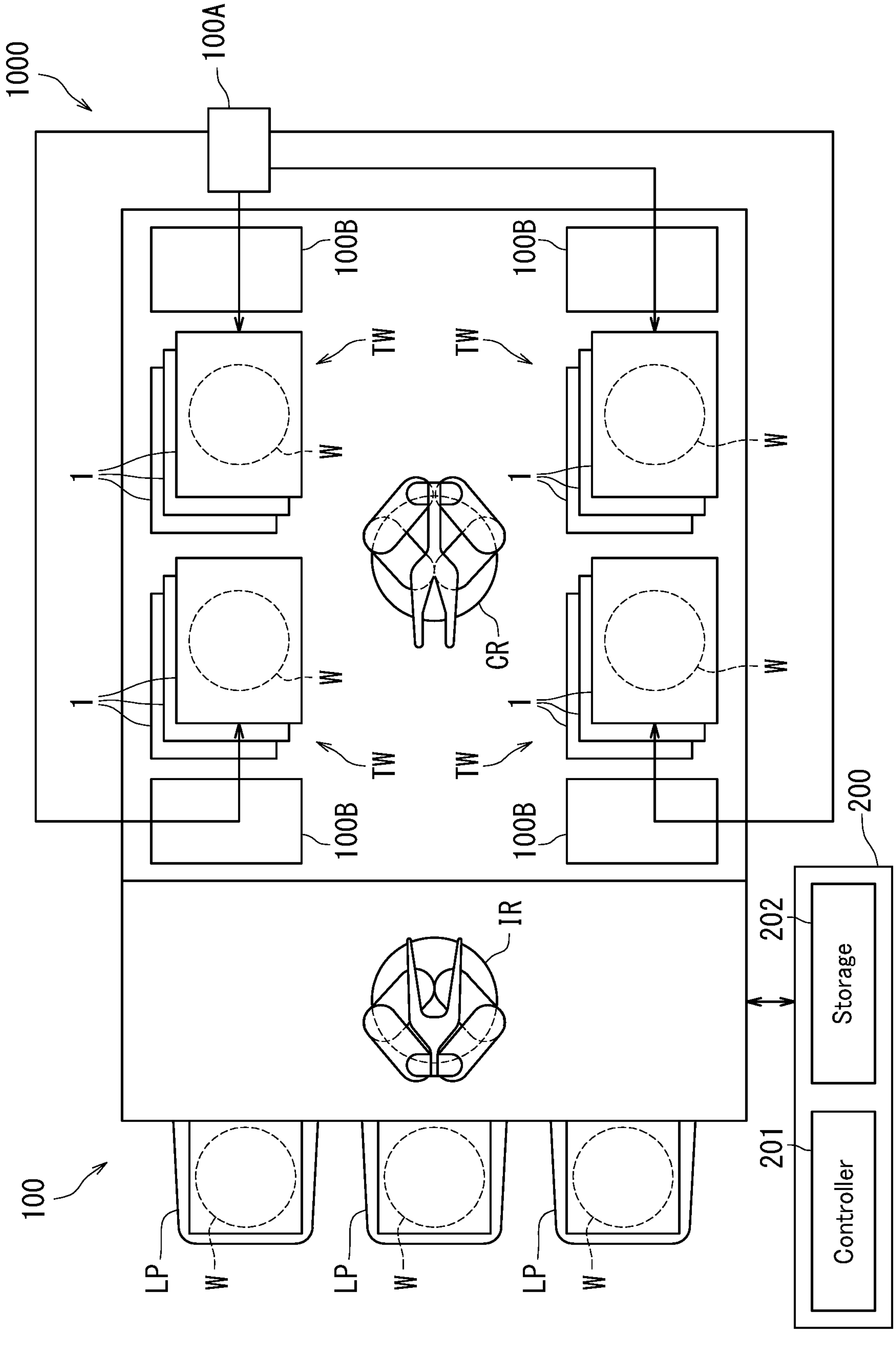
FIG. 4 is a schematic diagram of an example of the configuration of a substrate processing apparatus included in the substrate processing system according to an embodiment of the present disclosure.

Here, an example of the configuration of the substrate processing apparatus 100 will be described with reference to FIGS. 4 and 5. FIG. 4 is a schematic diagram of an example of the configuration of the substrate processing apparatus 100 included in the substrate processing system 1000 of the present embodiment. In detail, FIG. 4 is a schematic plan view of an example of the configuration of the substrate processing apparatus 100. The substrate processing apparatus 100 processes substrates W with a processing liquid. More specifically, the substrate processing apparatus 100 is a single-wafer apparatus and processes the substrates W one at a time.

As illustrated in FIG. 4, the substrate processing apparatus 100 includes a plurality of substrate processing sections 1, a fluid cabinet 100A, a plurality of fluid boxes 100B, a plurality of load ports LP, an indexer robot IR, and a center robot CR.

Each of the load ports LP accommodates a plurality of substrates W in a stacked manner. The indexer robot IR transports the substrates W between the load ports LP and the center robot CR. The center robot CR transports the substrates W between the indexer robot IR and the substrate processing sections 1. Note that it is possible to provide a loading table (path) on which the substrates W are temporarily placed between the indexer robot IR and the center robot CR to constitute an apparatus configuration for indirect delivery of the substrates W between the indexer robot IR and the center robot CR via the loading table.

The substrate processing sections 1 form a plurality of towers TW (four towers TW in FIG. 4). The towers TW are arranged so as to surround the center robot CR in plan view. Each of the towers TW includes a plurality of vertically stacked substrate processing sections 1 (three substrate processing sections 1 in FIG. 4).

The fluid cabinet 100A contains processing liquids. The fluid boxes 100B each correspond to one of the towers TW. The processing liquids in the fluid cabinet 100A are supplied via any one fluid box 100B of the fluid boxes 100B to all the substrate processing sections 1 included in a tower TW corresponding to the one fluid box 100B.

Each of the substrate processing sections 1 supplies the processing liquids to a substrate W to process the substrate W. The processing liquids include a chemical liquid and a rinse liquid. Examples of the chemical liquid include dilute hydrofluoric acid (DHF), hydrofluoric acid (HF), hydrofluoric nitric acid (mixed liquid of hydrofluoric acid and nitric acid ($HNO_3$)), buffered hydrofluoric acid (BHF), ammonium fluoride, HFEG (mixed liquid of hydrofluoric acid and ethylene glycol), phosphoric acid ($H_3PO_4$), sulfuric acid, acetic acid, nitric acid, hydrochloric acid, ammonia water, hydrogen peroxide water, organic acids (e.g., citric acid and oxalic acid), organic alkalis (e.g., tetramethylammonium hydroxide (TMAH)), sulfuric acid/hydrogen peroxide mixture (SPM), ammonia hydrogen peroxide mixture (SC1), hydrochloric acid/hydrogen peroxide mixture (SC2), isopropyl alcohol (IPA), a surfactant, and a corrosion inhibitor. Examples of the rinse liquid include pure waters (e.g., deionized water), carbonated water, electrolytic ionized water, hydrogen water, ozone water, and hydrochloric acid water with dilute concentration (e.g., about 10 ppm to 100 ppm).

The control device 200 is described next. The control device 200 controls operation of each element of the substrate processing apparatus 100. For example, the control device 200 controls the substrate processing sections 1, the load ports LP, the indexer robot IR, and the center robot CR. The control device 200 includes a controller 201 and storage 202.

The controller 201 controls the operation of each element of the substrate processing apparatus 100 based on various information stored in the storage 202. Furthermore, on the basis of various information stored in the storage 202, the controller 201 performs generation (Step S2) of the dataset DS described with reference to FIG. 1 and generation (Step S3) of the recommended values RX (recommended condition) of the parameters. The controller 201 is an example of an "arithmetic processing section".

The controller 201 includes a processor. For example, the controller 201 includes a central processing unit (CPU) or a micro processing unit (MPU). The controller 201 may include a general-purpose calculator, a dedicated calculator, a graphics processing unit (GPU), a neural network processing unit (NPU), or a quantum computer. The dedicated calculator includes an application specific integrated circuit (ASIC), for example.

The storage 202 stores therein variable information for controlling the operation of the substrate processing apparatus 100. The storage 202 further stores therein various information for performing generation (Step S2) of the dataset DS described with reference to FIG. 1 and generation (Step S3) of the recommended values RX (recommended condition) of the parameters.

Specifically, the storage 202 stores computer programs therein. The computer programs include computer programs for controlling the operation of the substrate processing apparatus 100. Furthermore, the computer programs include a support program PR (see FIG. 5). The support program PR includes a computer program for performing generation (Step S2) of the dataset DS described with reference to FIG. 1 and generation (Step S3) of the recommended values RX (recommended condition) of the parameters.

The storage 202 further stores data therein. The data includes recipe data. The recipe data indicates a recipe that defines processing details, a processing condition, and processing procedures for substrates W. Various parameters are defined in the recipe as the processing condition. The data further includes various parameters that are not defined in the recipe. In the following, setting values of parameters defined in the recipe may be also referred to as "recipe setting values". Also, setting values of parameter not defined in the recipe may be also referred to as "non-recipe setting values".

Examples of the recipe setting values include setting values of the flow rates of various processing liquids, a setting value of a substrate rotational speed, setting values of various pressures, and various setting times. Examples of the non-recipe setting values include a setting value of temperature of a specific processing liquid.

The storage 202 includes a main storage device. The main storage device is semiconductor memory, for example. The storage 202 may further include an auxiliary storage device. The auxiliary storage device includes at least one of semiconductor memory and a hard disk drive, for example. The storage 202 may include a removable medium.

The substrate processing apparatus 100 will be described next with reference to FIGS. 4 and 5. FIG. 5 is a schematic cross-sectional view of an example of the configuration of a substrate processing section 1 illustrated in FIG. 4.

Figure 5:
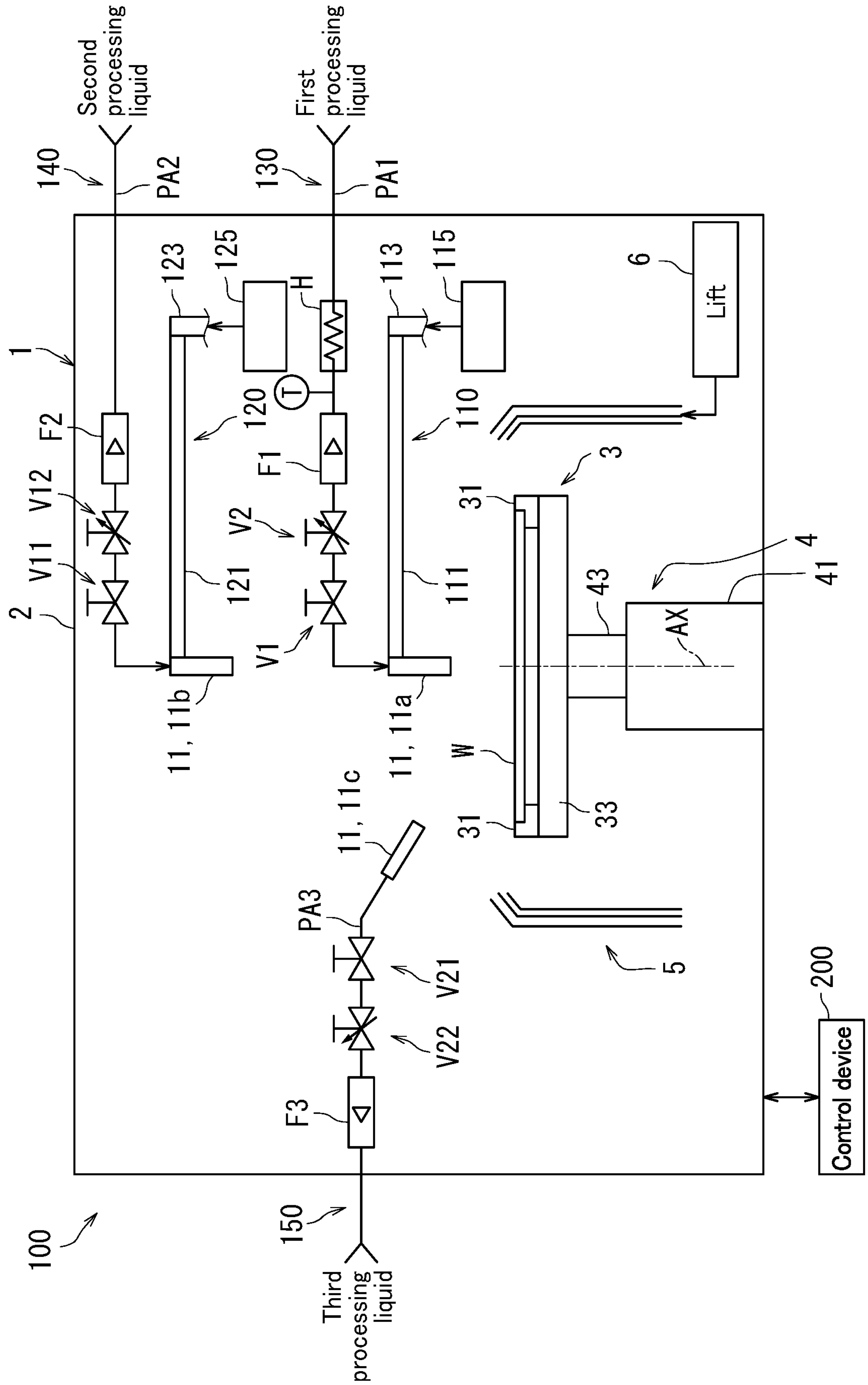
FIG. 5 is a schematic cross-sectional view of an example of the configuration of a substrate processing section illustrated in FIG. 4.

As illustrated in FIG. 5, the substrate processing section 1 includes a chamber 2, a spin chuck 3, a spin motor 4, a guard section 5, a lift 6, a plurality of nozzles 11, a first nozzle moving section 110, and a second nozzle moving section 120. As illustrated in FIG. 5, the substrate processing apparatus 100 includes a first supply section 130, a second supply section 140, and a third supply section 150.

The chamber 2 is a substantially box-shaped box with an inner space therein. A non-illustrated shutter and a non-illustrated opening and closing mechanism for the shutter are provided in the chamber 2. Usually, the shutter is closed, and the atmosphere inside the chamber 2 is isolated from the atmosphere outside the chamber 2. In transport of a substrate W into the chamber 2 by the center robot CR (FIG. 4) or transport of the substrate W out of the chamber 2 by the center robot CR (FIG. 4), the shutter is opened.

Substrates W are accommodated in the chamber 2 one at a time. The chamber 2 accommodates the spin chuck 3, the spin motor 4, the guard section 5, the lift 6, the nozzles 11, the first nozzle moving section 110, and the second nozzle moving section 120.

The spin chuck 3 holds a substrate W horizontally. The spin chuck 3 is an example of a "substrate holding section". Specifically, the spin chuck 3 includes a plurality of chuck members 31 and a spin base 33. The spin base 33 is substantially disc-shaped and supports the chuck members 31 in a horizontal posture. The chuck members 31 are disposed at the spin base 33 along the edge of the spin base 33. The chuck members 31 supports the peripheral part of the substrate W to hold the substrate W in a horizontal posture. The spin chuck 3 is controlled by the control device 200.

The spin motor 4 rotates the substrate W and the spin chuck 3 together about a rotation axis AX as a center. The rotation axis AX extends in a substantially vertical direction. The rotation axis AX is an example of a "central axis", and the spin motor 4 is an example of a "substrate rotation section". In detail, the spin motor 4 rotates the spin base 33 about the rotation axis AX as a center. Accordingly, the spin base 33 rotates about the rotation axis AX as a center. As a result, the substrate W held by the chuck members 31 disposed at the spin base 33 rotates about the rotation axis AX as a center.

Specifically, the spin motor 4 includes a motor main body 41 and a shaft 43. The shaft 43 is coupled to the spin base 33. The motor main body 41 rotates the shaft 43. As a result, the spin base 33 rotates. The motor main body 41 is controlled by the control device 200.

The nozzles 11 each supply a processing liquid to the substrate W. In the present embodiment, the nozzles 11 supply a first processing liquid, a second processing liquid, and a third processing liquid to the substrate W. More specifically, the nozzles 11 include a first nozzle 11*a*, a second nozzle 11*b*, and a third nozzle 11*c*.

The first nozzle 11*a* supplies the first processing liquid to the substrate W. In detail, the first nozzle 11*a* ejects the first processing liquid toward the substrate W under rotation. The first processing liquid is a chemical liquid.

The first supply section 130 supplies the first processing liquid to the first nozzle 11*a*. Specifically, the first supply section 130 includes a first pipe PA1, a first opening and closing valve V1, a first control valve V2, a first flow rate sensor F1, a temperature sensor T, and a heating member H.

The first pipe PA1 allows the first processing liquid to flow to the first nozzle 11*a*. Note that a part of the first pipe PA1 is accommodated within the chamber 2. The first opening and closing valve V1 is disposed in the first pipe PA1. The first opening and closing valve V1 switches between supply and supply stop of the first processing liquid to the first nozzle 11*a*. Examples of the actuator for the first opening and closing valve V1 include a pneumatic actuator and an electric actuator. The first opening and closing valve V1 is controlled by the control device 200.

The first control valve V2 is disposed in the first pipe PA1. The first control valve V2 controls the flow rate of the first processing liquid flowing in the first pipe PA1. The opening of the first control valve V2 is adjustable. An example of the actuator for the first control valve V2 is an electric actuator. The first control valve V2 is controlled by the control device 200.

The first flow rate sensor F1 detects the flow rate of the first processing liquid flowing in the first pipe PA1. The flow rate of the first processing liquid is an example of "physical quantity". The parameter setting values X include a setting value of the flow rate of the first processing liquid. The setting value of the flow rate of the first processing liquid is an example of the recipe setting values. A detection result SE by the first flow rate sensor F1 is an example of sensing data Z1 and is input to the control device 200.

The heating member H heats the first processing liquid flowing in the first pipe PA1. The heating member H is controlled by the control device 200. The temperature sensor T detects the temperature of the first processing liquid flowing in the first pipe PA1. The temperature of the first processing liquid is an example of the "physical quantity". The parameter setting values X include a setting value of the temperature of the first processing liquid. The setting value of the temperature of the first processing liquid is an example of the "non-recipe setting values". A detection result SE by the temperature sensor T is an example of the sensing data Z1 and is input to the control device 200.

The first nozzle moving section 110 moves the first nozzle 11*a* in a substantially vertical direction and a substantially horizontal direction. Specifically, the first nozzle moving section 110 includes a first arm 111, a first rotary shaft 113, and a first nozzle moving mechanism 115.

The first arm 111 extends in a substantially horizontal direction. The first nozzle 11*a* is disposed at the tip end of the first arm 111. The first arm 111 is connected to the first rotary shaft 113. The first rotary shaft 113 extends in a substantially vertical direction.

The first nozzle moving mechanism 115 rotates the first rotary shaft 113 in both forward and reverse directions about a rotation axis extending in a substantially vertical direction to swing the first arm 111 along a substantially horizontal plane. As a result, the first nozzle 11*a* moves along the substantially horizontal plane. Furthermore, the first nozzle moving mechanism 115 brings the first rotary shaft 113 up and down in a substantially vertical direction to bring the first arm 111 up and down. As a result, the first nozzle 11*a* moves in a substantially vertical direction. The first nozzle moving mechanism 115 may include a ball screw mechanism and an electric motor that provides driving power to the ball screw mechanism. The first nozzle moving mechanism 115 is controlled by the control device 200.

The second nozzle 11*b* supplies the second processing liquid to the substrate W. In detail, the second nozzle 11*b* ejects the second processing liquid toward the substrate W under rotation. The second processing liquid is a chemical liquid.

The second supply section 140 supplies the second processing liquid to the second nozzle 11*b*. Specifically, the second supply section 140 includes a second pipe PA2, a second opening and closing valve V11, a second control valve V12, and a second flow rate sensor F2.

The second pipe PA2 allows the second processing liquid to flow to the second nozzle 11*b*. Note that a part of the second pipe PA2 is accommodated within the chamber 2. The second opening and closing valve V11 is disposed in the second pipe PA2. The second opening and closing valve V11 switches between supply and supply stop of the second processing liquid to the second nozzle 11*b*. Examples of the actuator for the second opening and closing valve V11 include a pneumatic actuator and an electric actuator. The second opening and closing valve V11 is controlled by the control device 200.

The second control valve V12 is disposed in the second pipe PA2. The second control valve V12 controls the flow rate of the second processing liquid flowing in the second pipe PA2. The opening of the second control valve V12 is adjustable. An example of the actuator for the second control valve V12 is an electric actuator. The second control valve V12 is controlled by the control device 200.

The second flow rate sensor F2 detects the flow rate of the second processing liquid flowing in the second pipe PA2. The flow rate of the second processing liquid is an example of the "physical quantity". The parameter setting values X include a setting value of the flow rate of the second processing liquid. The setting value of the flow rate of the second processing liquid is an example of the recipe setting values. A detection result SE by the second flow rate sensor F2 is an example of the sensing data Z1 and is input to the control device 200.

The second nozzle moving section 120 moves the second nozzle 11*b* in a substantially vertical direction and a substantially horizontal direction. Specifically, the second nozzle moving section 120 includes a second arm 121, a second rotary shaft 123, and a second nozzle moving mechanism 125. The second nozzle moving mechanism 125 is controlled by the control device 200. The configuration of the second nozzle moving section is substantially the same as that of the first nozzle moving section 110, and description thereof is therefore omitted.

The third nozzle 11*c* supplies the third processing liquid to the substrate W. In detail, the third nozzle 11*c* ejects the third processing liquid toward the substrate W under rotation. The third processing liquid is a rinse liquid. The third nozzle 11*c* is a fixed nozzle.

The third supply section 150 supplies the third processing liquid to the third nozzle 11*c*. Specifically, the third supply section 150 includes a third pipe PA3, a third opening and closing valve V21, a third control valve V22, and a third flow rate sensor F3.

The third pipe PA3 allows the third processing liquid to flow to the third nozzle 11*c*. Note that a part of the third pipe PA3 is accommodated within the chamber 2. The third opening and closing valve V21 is disposed in the third pipe PA3. The third opening and closing valve V21 switches between supply and supply stop of the third processing liquid to the third nozzle 11*c*. Examples of the actuator for the third opening and closing valve V21 include a pneumatic actuator and an electric actuator. The third opening and closing valve V21 is controlled by the control device 200.

The third control valve V22 is disposed in the third pipe PA3. The third control valve V22 controls the flow rate of the third processing liquid flowing in the third pipe PA3. The opening of the third control valve V22 is adjustable. An example of the actuator for the third control valve V22 is an electric actuator. The third control valve V22 is controlled by the control device 200.

The third flow rate sensor F3 detects the flow rate of the third processing liquid flowing in the third pipe PA3. The flow rate of the third processing liquid is an example of the "physical quantity". The parameter setting values X include a setting value of the flow rate of the third processing liquid. The setting value of the flow rate of the third processing liquid is an example of the recipe setting values. A detection result SE by the third flow rate sensor F3 is an example of the sensing data Z1 and is input to the control device 200.

The guard section 5 is disposed outward of the spin chuck 3 and the spin motor 4. The guard section 5 has a substantially cylindrical shape. In other words, the guard section 5 surrounds the spin chuck 3 and the spin motor 4. The guard section 5 receives the processing liquids (first to third processing liquids) scattering from the rotating substrate W. In the example illustrated in FIG. 5, the guard section 5 includes three guards.

The lift 6 lifts up and down the guard section 5. In the example illustrated in FIG. 5, the lift 6 individually lifts the three guards. The lift 6 is controlled by the control device 200. Specifically, the lift 6 brings the guard section 5 (three guards herein) up and down between a liquid receiving position and a retraction position. The liquid receiving position is located at a higher level than the retraction position.

In detail, in transport of a substrate W into the chamber 2 by the center robot CR (FIG. 4) or transport of the substrate W out of the chamber 2 by the center robot CR (FIG. 4), the guard section 5 is located at the retraction position. Each of the guards is located at the liquid receiving position in receipt of the processing liquids.

Figure 6:
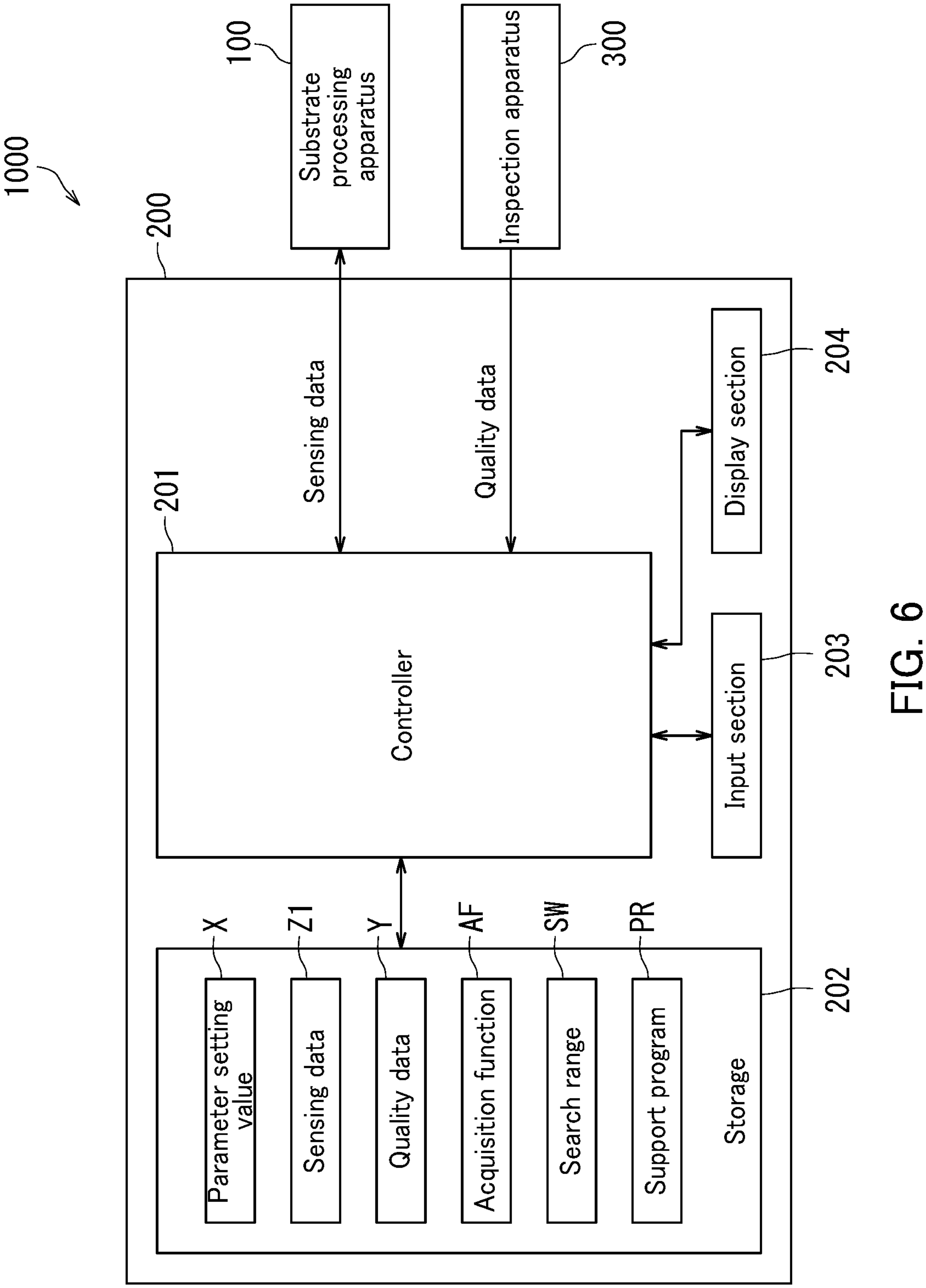
FIG. 6 is a block diagram of an example of the configuration of a control device according to an embodiment of the present disclosure.

The control device 200 will be described next with reference to FIG. 6. FIG. 6 is a block diagram of an example of the configuration of the control device 200 in the present embodiment. As described previously, the control device 200 is an example of the "support device". As illustrated in FIG. 6, the control device 200 further includes an input section 203 and a display section 204 in addition to the controller 201 and the storage 202.

The input section 203 is a user interface device that the operator operates. The input section 203 inputs to the controller 201 an instruction (control signal) according to a user operation. The input section 203 also inputs to the controller 201 data according to the user operation. The input section 203 may include a keyboard and a mouse. The input section 203 may include a touch sensor superimposed on the display surface of the display section 204. A graphical interface may be constituted as a result of superimposition of the touch sensor on the display surface of the display section 204. For example, processing of the substrate W by the substrate processing apparatus 100 can start when the operator operates the input section 203.

Note that the input section 203 may further include an interface accessible to a removable medium. Examples of the interface include a USB terminal, a slot to which a memory card is to be inserted, and a reading device that reads data from an optical disc. The USB terminal may be connected to a USB cable of a memory card reader.

The display section 204 displays various screens or various images. For example, the display section 204 displays a screen for the operator to operate the control device 200 or the substrate processing apparatus 100. Furthermore, the display section 204 may display the recommended values RX of the parameters described with reference to FIG. 1. For example, the display section 204 includes a display device such as a liquid crystal display device or an organic electroluminescent (EL) display device.

As described previously, the sensing data Z1 is input to the control device 200 from the substrate processing apparatus 100. Furthermore, the quality data Y is input to the control device 200 from the inspection apparatus 300. The controller 201 causes the storage 202 to store the sensing data Z1 and the quality data Y.

The storage 202 stores therein the parameter setting values X, the sensing data Z1, the quality data Y, an acquisition function AF, a search range SW, and the support program PR. The controller 201 generates the recommended values RX of the parameters based on the parameter setting values X, the sensing data Z1, the quality data Y, the acquisition function AF, the search range SW, and the support program PR. Specifically, the controller 201 performs, based on the parameter setting values X, the sensing data Z1, the quality data Y, the acquisition function AF, the search range SW, and the support program PR, generation (Step S2) of the dataset DS described with reference to FIG. 1 and generation (Step S3) of the recommended values RX (recommended condition) of the parameters.

The support program PR includes machine learning models M. Specifically, the support program PR includes a first machine learning model M1 and a second machine learning model M2. The support program PR further includes a program for executing Bayesian optimization. The acquisition function AF and the search range SW are used for Bayesian optimization. Note that the acquisition function AF and the search range SW may be included in the support program PR.

Figures 7A, 7B:
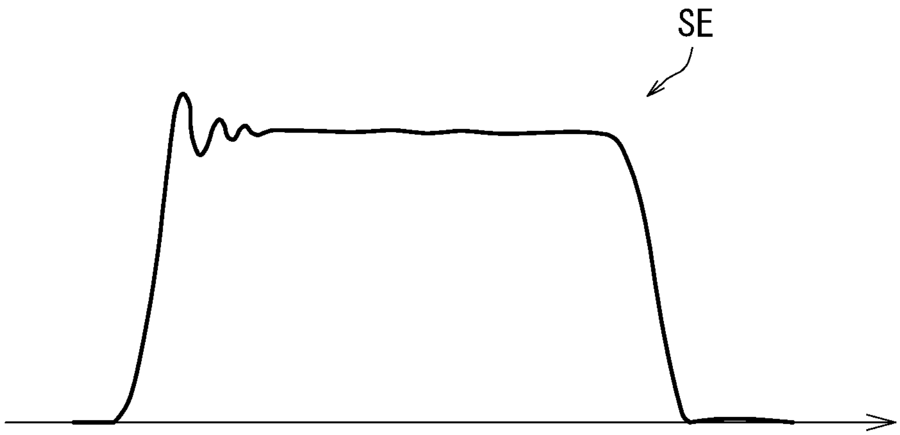
FIG. 7A is a diagram indicating parameter setting values, sensing data, and quality data.
FIG. 7B is a diagram indicating an example of a detection result.

The parameter setting values X, the sensing data Z1, and the quality data Y are described next with reference to FIGS. 6 and 7A. FIG. 7A indicates the parameter setting values X, the sensing data Z1, and the quality data Y. As indicated in FIG. 7A, each of the parameter setting values X indicates an aggregation of setting values P (e.g., a setting value P1, and a setting value P2) of various parameters. Each sensing data Z1 indicates an aggregation of detection results SE (e.g., the detection result SE1 and the detection result SE2) by various sensors provided in the substrate processing apparatus 100. The storage 202 associates parameter setting values X, sensing data Z1, and quality data Y with each other and stores then each time the quality inspection (experiment) described with reference to FIG. 1 is done.

The detection results SE is described next with reference to FIG. 7B. FIG. 7B indicates an example of the detection results SE. As illustrated in FIG. 7B, each of the detection results SE is raw data indicating a physical quantity detected by a sensor. As such, the number of data pieces of the detection result SE is large.

Figure 8:
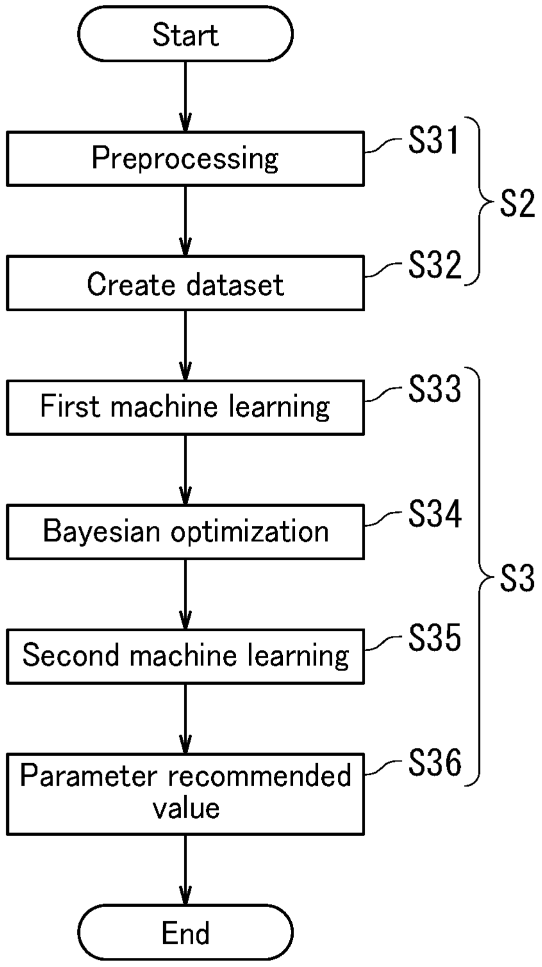
FIG. 8 is a flowchart depicting the support method according to an embodiment.

The support method according to the present embodiment will be described next with reference to FIGS. 6 and 8. In the present embodiment, the support method is implemented by the control device 200 described with reference to FIG. 6. FIG. 8 is a flowchart depicting the support method of the present embodiment. In detail, FIG. 8 depicts a flow of processing that the controller 201 performs. The processing depicted in FIG. 8 includes processing (Step S2) of generating a dataset DS and processing (Step S3) of generating recommended values RX (recommended condition) of the parameters. The processing (Step S2) of generating a dataset DS includes Step S31 and Step S32. The processing (Step S3) of generating recommended values RX (recommended condition) of the parameters includes Steps S33 to S36. The processing depicted in FIG. 8 starts upon the operator operating the input section 203 to instruct generation of the parameter recommended values RX.

As depicted in FIG. 8, upon generation of the parameter recommended values RX being instructed, the controller 201 performs preprocessing on each detection result SE included in the sensing data Z1 to generate preprocessed sensing data Z2 (Step S31). The number of data pieces of each detection result SE is reduced by the preprocessing. In the following, the detection result SE subjected to the preprocessing may be also referred to as "preprocessed data ASE". The preprocessed sensing data Z2 includes the preprocessed data ASE (e.g., preprocessed data ASE1 and preprocessed data ASE2). The preprocessed sensing data Z2 is an example of "detection data relating to a physical quantity".

The preprocessing is processing of extracting a feature amount of the raw data (detection result SE), for example. For example, the preprocessing includes processing (dimension reduction processing) of reducing a dimension of the raw data, processing of calculating a summary statistic of the raw data, or processing of extracting any one or more data pieces from the raw data.

The dimension reduction processing is for example linear dimension reduction processing or a nonlinear dimension reduction processing. The algorithm of the linear dimension reduction processing is principal component analysis, independent component analysis, or tensor decomposition, for example. The algorithm of the nonlinear dimension reduction processing is uniform manifold approximation and projection (UMAP) or an autoencoder. For example, a low-dimensional feature amount of a detection result SE (raw data) is acquired through the principal component analysis. As such, in a case in which the preprocessing is the principal component analysis, the preprocessed data ASE indicates a low-dimensional feature amount of the detection result SE (raw data).

The summary statistic indicates an average value, a median value, or a mode value, for example. As a result of calculation of a summary statistic of a detection result SE (raw data), the average value, the median value, or the mode value of the detection result SE (raw data) is acquired. Accordingly, in a case in which the preprocessing is processing of calculating a summary statistic, the preprocessed data ASE indicates the average value, median value, or mode value of the detection result SE (raw data).

In Step S32, the controller 201 creates a first dataset DS1 and a second dataset DS2 based on the quality data Y, the preprocessed sensing data Z2, and the parameter setting values X. The first dataset DS1 is an example of "first training data", and is used for training (learning) of the first machine learning model M1. The second dataset DS2 is an example of "second training data", and is used for training (learning) of the second machine learning model M2. The first dataset DS1 and the second dataset DS2 will be described later with reference to FIGS. 9A to 9C.

In Step S33, the controller 201 causes the first machine learning model M1 to perform learning of the first dataset DS1. As a result, a predictive model PM is built that predicts quality of the substrate processing. In the present embodiment, the predictive model PM is a model that predicts the number of particles attached to the substrate W as a result of the substrate processing.

In Step S34, the controller 201 executes Bayesian optimization based on the predictive model PM, the acquisition function AF, and the search range SW to acquire recommended values Z3 (e.g., a recommended value RSE1 and a recommended value RSE2) of the preprocessed data ASE that bring quality of the substrate processing close to target quality. In the present embodiment, the controller 201 acquires by Bayesian optimization a recommended value Z3 of each piece of the preprocessed data ASE that minimize the predictive model PM. Specifically, the controller 201 acquires a recommended value Z3 of each piece of the preprocessed data ASE that minimizes the number of particles attached to the substrate W as a result of the substrate processing. In the following, the recommended values Z3 of the preprocessed data ASE may be also referred to below as "sensing data recommended values Z3". The sensing data recommended values Z3 each are an example of a "detection data recommended value".

Examples of the acquisition function AF include expected improvement (EI), mutual information (MI), probability of improvement (PI), and upper confidence bound (UCB). The search range SW is any range. The search range SW may be input by the operator operating the input section 203. Note that although the sensing data recommended values Z3 that minimize the predictive model PM are acquired by Bayesian optimization in the present embodiment, the sensing data recommended values Z3 that maximize the predictive model PM may be acquired according to the index of the quality of the substrate processing.

In Step S35, the controller 201 causes the second machine learning model M2 to perform learning of the second dataset DS2. In Step S36, the sensing data recommended values Z3 (e.g., the recommended value RSE1 and the recommended value RSE2) are input to the second machine learning model M2 having performed learning to convert the sensing data recommended values Z3 to the recommended values RX (e.g., the recommended value RP1 and the recommended value RP2) of the parameters.

The first dataset DS1 and the second dataset DS2 will be described next with reference to FIGS. 6 and 9A to 9C. FIG. 9A illustrates processing of dividing parameter setting values X. FIG. 9B indicates first datasets DS1. FIG. 9C indicates second datasets DS2.

As illustrated in FIG. 9A, the controller 201 divides parameter setting values X into a first parameter setting value X1 and a second parameter setting value X2 before creation of a first dataset DS1 and a second dataset DS2.

The first parameter setting value X1 includes setting values P (e.g., a first setting value P1 and a second setting value P2) of parameters of which corresponding physical quantities are detected by corresponding sensors. In the example described for example with reference to FIG. 5, the flow rates of the first to third processing liquids are detected by the first to third flow sensors F1 to F3, respectively. As such, the flow rates of the first to third processing liquids are parameters of which corresponding physical quantities are detected by the corresponding sensors. In the following, a parameter of which corresponding physical quantity is detected by a corresponding sensor may be also referred to below as "detection target parameter". The first parameter setting value X1 is an aggregation of setting values P of detection target parameters.

The second parameter setting value X2 indicates an aggregation of setting values P (e.g., a setting value P4 and a setting value P5) of parameters other than the detection target parameters among the parameter setting values X. For example, the second parameter setting value X2 includes a setting value of a substrate rotational speed, and various setting times. Note that the substrate rotational speed indicates a rotational speed of the motor main body 41 described with reference to FIG. 5.

As illustrated in FIG. 9B, a first dataset DS1 includes quality data Y, preprocessed sensing data Z2, and a second parameter setting value X2. That is, the controller 201 creates a first dataset DS1 using the quality data Y, the preprocessed sensing data Z2, and the second parameter setting value X2. In detail, the controller 201 stores the quality data Y, the preprocessed sensing data Z2, and the second parameter setting value X2 in the storage 202 in association with each other each time the quality inspection (experiment) described with reference to FIG. 1 is done.

As illustrated in FIG. 9C, a second dataset DS2 includes a first parameter setting value X1, preprocessed sensing data Z2, and a second parameter setting value X2. That is, the controller 201 creates a second dataset DS2 using the first parameter setting value X1, the preprocessed sensing data Z2, and the second parameter setting value X2. In detail, the controller 201 stores the first parameter setting value X1, the preprocessed sensing data Z2, and the second parameter setting value X2 in the storage 202 in association with each other each time the quality inspection (experiment) described with reference to FIG. 1 is done.

Figure 10A:
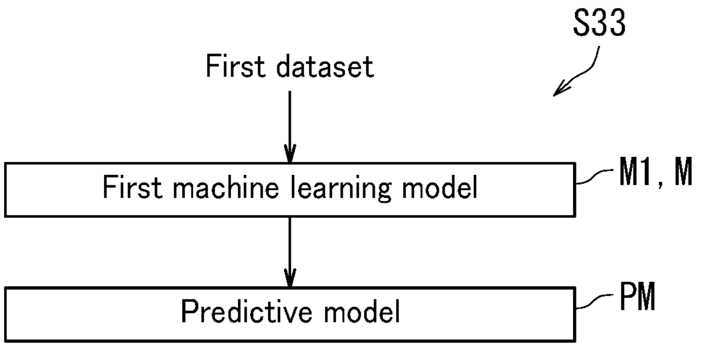
FIG. 10A depicts processing of causing a first machine learning model to learn a first dataset.

Learning by the first machine learning model M1 is described next with reference to FIGS. 6, 9B, and 10A. FIG. 10A depicts processing (Step S33 in FIG. 8) of causing the first machine learning model M1 to perform learning of a first dataset DS1.

As depicted in FIG. 10A, the controller 201 causes the first machine learning model M1 to perform learning of a first dataset DS1. In detail, as illustrated in FIG. 9B, the quality data Y is input to the first machine learning model M1 as a target variable and the preprocessed sensing data Z2 and the second parameter setting value X2 are input to the first machine learning model M1 as explanatory variables. As a result, the first machine learning model M1 is trained (performs learning), thereby building a predictive model PM.

For example, the algorithm of the first machine learning model M1 is Gaussian process regression. However, the algorithm of the first machine learning model M1 is not limited particularly so long as it is a model capable of generating a predictive distribution. For example, the algorithm of the first machine learning model M1 may be Bayesian linear regression, hierarchical Bayes, Bayesian deep learning, or natural gradient boosting (NGBoost).

Figure 10B:
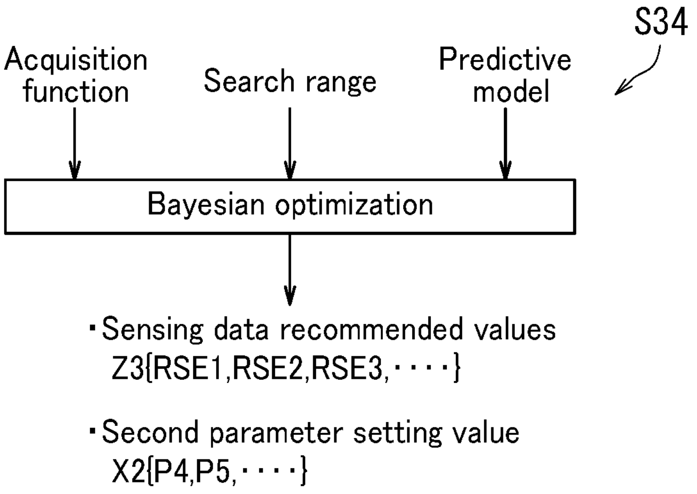
FIG. 10B illustrates processing of Bayesian optimization.

Bayesian optimization is described next with reference to FIGS. 6 and 10B. FIG. 10B illustrates processing (Step S34 in FIG. 8) of Bayesian optimization.

As illustrated in FIG. 10B, the controller 201 executes Bayesian optimization based on the acquisition function AF, the search range SW, and the predictive model PM (the trained first machine learning model M1). As a result, sensing data recommended values Z3 and a second parameter setting value X2 are acquired as values that minimize the number of particles attached to the substrate as a result of the substrate processing. Here, the sensing data recommended values Z3 indicate an aggregation of recommended values RSE (e.g., a recommended value RSE1 and a recommended value RSE2) of the preprocessed data ASE.

In detail, the predictive model PM is a model that predicts the number (target variable) of particles attached to the substrate W as a result of the substrate processing based on the preprocessed sensing data Z2 and the second parameter setting value X2 each of which is an explanatory variable, as described previously. Bayesian optimization is processing of searching within the search range SW for preprocessed sensing data Z2 and a second parameter setting value X2 that minimize the number of particles attached to the substrate W as a result of the substrate processing.

Figure 11A:
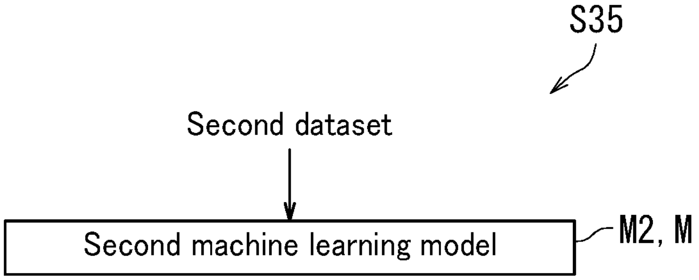
FIG. 11A depicts processing of causing a second machine learning model to learn a second dataset.

Learning by the second machine learning model M2 is described next with reference to FIGS. 6, 9C, and 11A. FIG. 11A depicts processing (Step S35 in FIG. 8) of causing the second machine learning model M2 to perform learning of a second dataset DS2.

As depicted in FIG. 11A, the controller 201 causes the second machine learning model M2 to perform learning of a second dataset DS2. In detail, as indicated in FIG. 9C, the first parameter setting value X1 is input to the second machine learning model M2 as a target variable and the preprocessed sensing data Z2 and the second parameter setting value X2 are input to the second machine learning model M2 as explanatory variables. As a result, the second machine learning model M2 that has performed learning becomes a model that predicts a first parameter setting value X1 based on the preprocessed sensing data Z2 and the second parameter setting value X2.

Note that the algorithm of the second machine learning model M2 is not limited particularly. An example of the algorithm of the second machine learning model M2 is an algorithm that outputs a plurality of values, such as random forest or deep leaning.

Figure 11B:
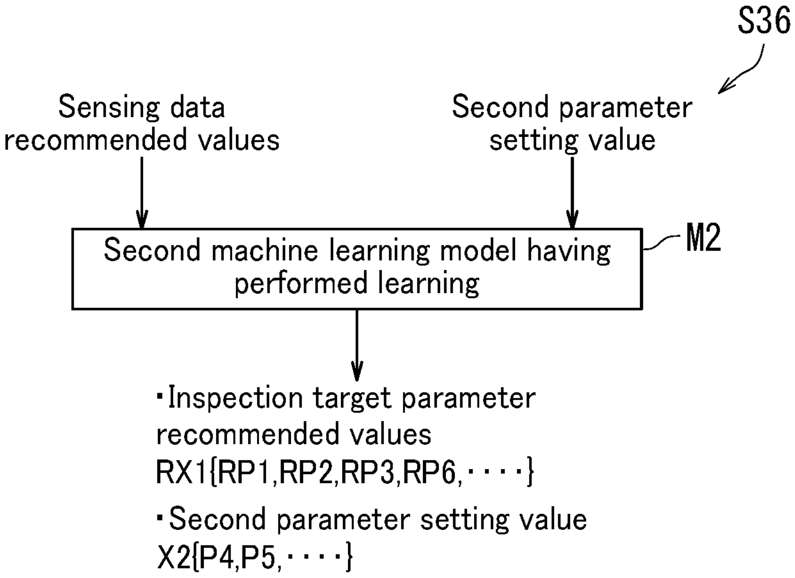
FIG. 11B depicts processing of generating recommended values of parameters.

Processing of generating recommended values RX of parameters is described next with reference to FIGS. 6 and 11B. FIG. 11B depicts processing (Step S36 in FIG. 8) of generating recommended values RX of the parameters.

As depicted in FIG. 11B, the controller 201 inputs the sensing data recommended values Z3 and the second parameter setting value X2 acquired by Bayesian optimization to the second machine learning model M2 having performed the learning of the second dataset DS2.

As described previously, the second machine learning model M2 having performed the learning builds a model that predicts a first parameter setting value X1 based on the preprocessed sensing data Z2 and the second parameter setting value X2. Accordingly, when the sensing data recommended values Z3 (recommended value RSE of each piece of preprocessed data ASE) rather than the preprocessed sensing data Z2 are input to the second machine learning model M2 having performed the learning, recommended values RX1 (e.g., a recommended value RP1 and a recommended value RP2) of the detection target parameter are output from the second machine learning model M2. In other words, the sensing data recommended values Z3 (e.g., the recommended value RSE1 and the recommended value RSE2) are converted to recommended values RX1 (e.g., a recommended value RP1 and a recommended value RP2) of the detection target parameters. Note that since the second parameter setting value X2 is itself a recommended value, the controller 201 outputs the input second parameter setting value X2 as itis.

Next, variations of the second machine learning model M2 are described with reference to FIGS. 12 and 13. The second machine learning model M2 may be a model that outputs a single value. In the following, the model that outputs a single value may be also referred to as "single output model SM". Note that the algorithm of the single output model SM is linear regression, light GBM, or deep learning, for example.

Figure 12:
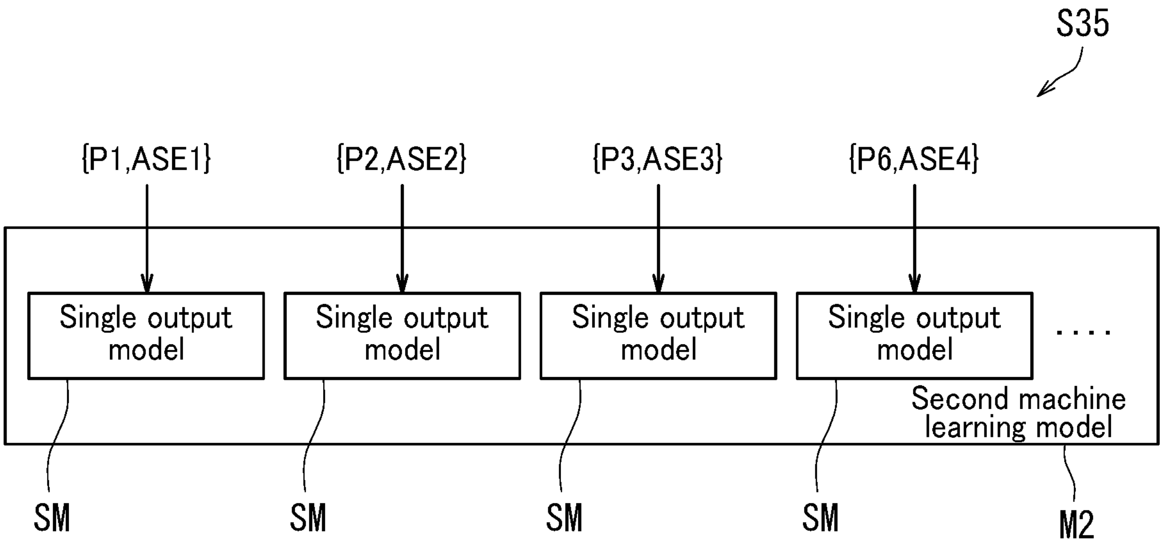
FIG. 12 illustrates a variation of the second machine learning model.

FIG. 12 illustrates a variation of the second machine learning model M2. As illustrated in FIG. 12, the second machine learning model M2 may include a plurality of single output models SM. Specifically, the second machine learning model M2 includes single output models SM of which the number is greater than or equal to the number of detection target parameters.

FIG. 12 illustrates processing (Step S35 in FIG. 8) of causing the second machine learning model M2 to perform learning of a second dataset DS2. As illustrated in FIG. 12, in a case in which the second machine learning model M2 includes a plurality of single output models SM, the controller 201 inputs to mutually different single output models SM respective combinations of a setting value P (target variable) of the inspection target parameter and corresponding preprocessed data ASE (explanatory variables). As a result, each single output model SM learns a corresponding one of the combinations of the setting values P of the inspection target parameters and the corresponding preprocessed data ASE, thereby building models that each predict a setting value P of one of the inspection target parameters from the preprocessed data ASE.

Figure 13:
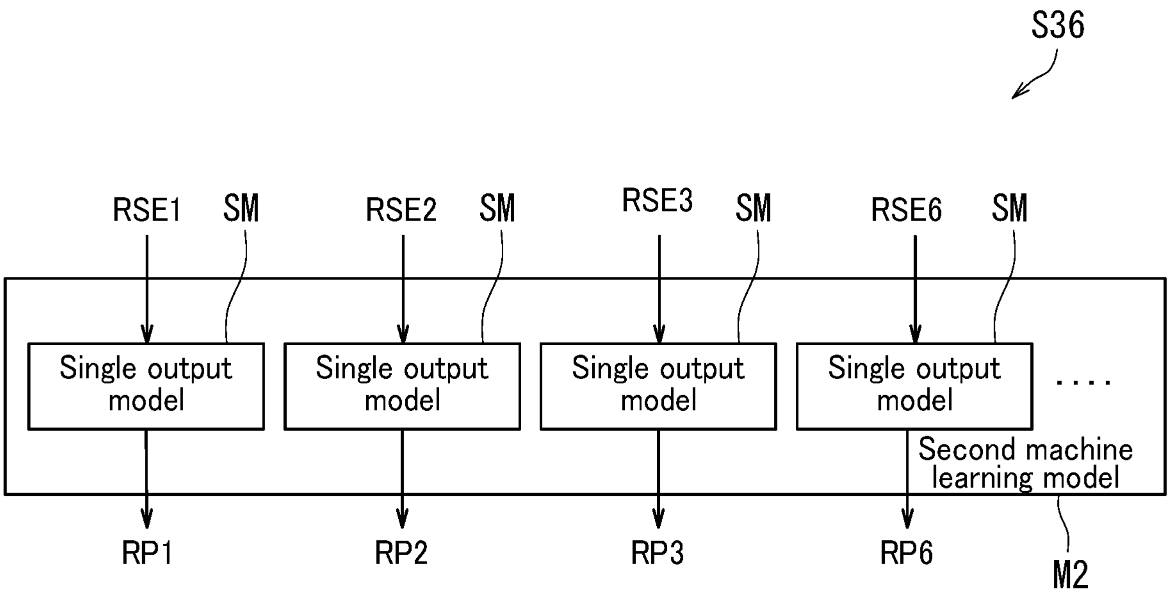
FIG. 13 illustrates processing of generating recommended values of inspection target parameters from the second machine learning model illustrated in FIG. 12.

FIG. 13 illustrates processing (Step S36 in FIG. 8) of generating recommended values RX1 (e.g., a recommended value RP1 and a recommended value RP2) of the inspection target parameters from the second machine learning model M2 illustrated in FIG. 12. As illustrated in FIG. 13, the controller 201 inputs recommended values RSE of corresponding preprocessed data ASE to the respective single output models SM. As a result, the single output models SM output recommended values RP (e.g., the recommended value RP1 and the recommended value RP2) of the inspection target parameters.

According to the embodiment described above, the quality of the substrate processing can be improved. That is, in the present embodiment, the actual physical quantities (sensing data Z1) of the inspection target parameters can be reflected in calculation of the recommended values RX1 of the inspection target parameters. As a result, the recommended values RX1 can be acquired that take into account discrepancy between the actual operation of the substrate processing apparatus 100 and the setting values X of the parameters. Thus, quality of the substrate processing can be improved.

According to the present embodiment, machine training is performed using the preprocessed data, which hardly causes excessive training. This increases accuracy in prediction by the machine learning model M to improve quality of the substrate processing. However, machine training may be performed with raw data.

Embodiments of the present disclosure have been described so far with reference to the drawings (FIGS. 1 to 13). However, the present disclosure is not limited to the above embodiment and may be implemented in various manners within a scope not departing from the gist thereof. Furthermore, the elements of configuration disclosed in the above embodiment can be altered as appropriate. For example, some of the elements of configuration indicated in an embodiment may be added to the elements of configuration in another embodiment. Alternatively, or additionally, some of all the elements of configuration indicated in an embodiment by be omitted from the embodiment.

The drawings schematically illustrate elements of configuration in order to facilitate understanding. Properties such as thickness, length, number, and interval of each element of configuration illustrated in the drawings may differ from actual properties thereof in order to facilitate preparation of the drawings. Furthermore, each element of configuration indicated in the above embodiments is an example and not a particular limitation. Various alterations may be made so long as there is no substantial deviation from the effects of the present disclosure.

For example, the processing that the substrate processing apparatus 100 in the embodiments described with reference to FIGS. 1 to 13 performs is, but is not limited to, etching or cleaning. The substrate processing may be any of blush cleaning, photosensitive film application, development, annealing, and drawing, for example.

Furthermore, the substrate processing apparatus 100 is a single-wafer substrate processing apparatus in the embodiments described with reference to FIGS. 1 to 13, but may be of batch type.

What is claimed is:

1. A support device that supports adjustment of values of parameters of a substrate processing apparatus that operates based on the parameters to perform substrate processing, the parameters including detection target parameters of which corresponding physical quantities are to be detected, the support device comprising an arithmetic processing section that includes a processor and outputs parameter recommended values using a first machine learning model and a second learning model, the parameter recommended values being recommended values of the values of the parameters, wherein the arithmetic processing section is configured or programmed to build a predictive model that predicts quality of the substrate processing performed by the substrate processing apparatus through the first machine learning model performing learning of first training data that includes detection data pieces relating to the physical quantities and quality data relating to the quality of the substrate processing, the predictive model being configured to accept detection data pieces relating to the physical quantities as input thereto and to predict and output the quality of the substrate processing, acquire detection data recommended values by executing Bayesian optimization based on the predictive model, an acquisition function, and a search range, the detection data recommended values being recommended values of the detection data pieces such that the predictive model outputs the quality of the substrate processing closest to target quality, cause the second machine learning model to perform learning of the second training data including the detection data pieces and values of the detection target parameters that are set at detection of the physical quantities, the second machine learning model having performed the learning being configured to accept the detection data recommended values as input thereto and to output the parameter recommended values, and convert the detection data recommended values to the parameter recommended values by inputting the detection data recommended values to the second machine learning model having performed the learning.

2. The support device according to claim 1, wherein the detection data pieces include preprocessed data pieces that are acquired by performing preprocessing on raw data pieces each indicating a corresponding one of the physical quantities, the arithmetic processing section is configured or programmed to generate the preprocessed data pieces by performing the preprocessing on each of the raw data pieces, and a number of data pieces of each of the preprocessed data pieces is smaller than that of each of the raw data pieces.

3. The support device according to claim 2, wherein the preprocessing includes processing of extracting a feature amount of each of the raw data pieces.

4. The support device according to claim 3, wherein the processing of extracting a feature amount of each of the raw data pieces includes processing of reducing a dimension of each of the raw data pieces.

5. The support device according to claim 3, wherein the processing of extracting a feature amount of each of the raw data pieces includes processing of calculating a summary statistic of each of the raw data pieces.

6. The support device according to claim 2, wherein the preprocessing includes processing of extracting any one or more data pieces from each of the raw data pieces.

7. A support method for supporting adjustment of values of parameters of a substrate processing apparatus that operates based on the parameters to perform substrate processing, the parameters including detection target parameters of which corresponding physical quantities are to be detected, the support method comprising:

building a predictive model that predicts quality of the substrate processing performed by the substrate processing apparatus through a first machine learning model performing learning of first training data that includes detection data pieces relating to the physical quantities and quality data relating to the quality of the substrate processing, the predictive model being configured to accept detection data pieces relating to the physical quantities as input thereto and to predict and output the quality of the substrate processing;

acquiring recommended values of the detection data pieces by executing Bayesian optimization based on the predictive model, an acquisition function, and a search range, the recommended values of the detection data pieces being values such that the predictive model outputs the quality of the substrate processing closest to target quality;

causing a second machine learning model to perform learning of second training data including the detection data pieces and values of the detection target parameters that are set at detection of the physical quantities, the second machine learning model having performed the learning being configured to accept the detection data recommended values as input thereto and to output the parameter recommended values; and converting the recommended values of the detection data pieces to recommended values of the parameters by inputting the recommended values of the detection data pieces to the second machine learning model having performed the learning.

8. The support method according to claim 7, wherein the detection data pieces include preprocessed data pieces that are acquired by performing preprocessing of raw data pieces each indicating a corresponding one of the physical quantities, the support method further comprises generating the preprocessed data pieces by performing the preprocessing on each of the raw data pieces, and a number of data pieces of each of the preprocessed data pieces is smaller than that of each of the raw data pieces.

9. The support method according to claim 8, wherein the preprocessing includes processing of extracting a feature amount of each of the raw data pieces.

10. The support method according to claim 9, wherein the processing of extracting a feature amount of each of the raw data pieces includes processing of reducing a dimension of each of the raw data pieces.

11. The support method according to claim 9, wherein the processing of extracting a feature amount of each of the raw data pieces includes processing of calculating summary statistics of the raw data pieces.

12. The support method according to claim 8, wherein the processing includes processing of extracting any one or more data pieces from each of the raw data pieces.

13. A substrate processing system comprising:

the support device according to claim 1; and the substrate processing apparatus that is configured to operate based on the parameters to perform the substrate processing.

14. A non-transitory computer-readable storage medium that stores therein a support program that a computer is to execute, wherein the support program causes the computer to execute arithmetic operation according to the support method according to claim 7.

* * * * *